(12) United States Patent
Hamada et al.

(10) Patent No.: US 12,509,196 B2
(45) Date of Patent: Dec. 30, 2025

(54) MARINE VESSEL MANEUVERING SYSTEM AND MARINE VESSEL

(71) Applicant: YAMAHA HATSUDOKI KABUSHIKI KAISHA, Iwata (JP)

(72) Inventors: Satoru Hamada, Shizuoka (JP); Akihiro Onoue, Shizuoka (JP); Toshio Suzuki, Shizuoka (JP); Masaru Suemori, Shizuoka (JP); Yoshiyuki Kadobayashi, Shizuoka (JP); Manami Oyama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 342 days.

(21) Appl. No.: 18/481,274

(22) Filed: Oct. 5, 2023

(65) Prior Publication Data
US 2024/0124104 A1 Apr. 18, 2024

(30) Foreign Application Priority Data

Oct. 12, 2022 (JP) ................. 2022-164035

(51) Int. Cl.
| | |
|---|---|
| B63B 79/15 | (2020.01) |
| B63B 43/00 | (2006.01) |
| B63B 49/00 | (2006.01) |
| B63B 79/10 | (2020.01) |
| B63B 79/40 | (2020.01) |
| G01C 21/16 | (2006.01) |
| G01C 21/20 | (2006.01) |
| G01C 5/00 | (2006.01) |
| G01C 13/00 | (2006.01) |

(52) U.S. Cl.
CPC .............. *B63B 79/15* (2020.01); *B63B 43/00* (2013.01); *B63B 49/00* (2013.01); *B63B 79/10* (2020.01); *B63B 79/40* (2020.01); *G01C 21/16* (2013.01); *G01C 21/203* (2013.01); *B63B 2043/006* (2013.01); *G01C 5/00* (2013.01); *G01C 13/004* (2013.01)

(58) Field of Classification Search
CPC ......... B63B 43/00; B63B 49/00; B63B 79/10; B63B 79/15; B63B 79/40; B63B 2043/006; G01C 21/10; G01C 21/12; G01C 21/16; G01C 21/165; G01C 21/20; G01C 21/203; G01C 5/00; G01C 13/004
USPC ........................................................ 73/170.31
See application file for complete search history.

(56) References Cited

U.S. PATENT DOCUMENTS

| | | | |
|---|---|---|---|
| 2009/0298359 | A1 | 12/2009 | Hiroshima et al. |
| 2021/0229791 | A1 | 7/2021 | Inoue |
| 2021/0394877 | A1* | 12/2021 | Kadota ................... B63B 79/40 |

FOREIGN PATENT DOCUMENTS

| | | | | |
|---|---|---|---|---|
| CA | 2681617 A1 * | 12/2007 | ............. | B63B 49/00 |
| CN | 110182345 A * | 8/2019 | ............. | B63H 21/17 |
| JP | 2009-286297 A | 12/2009 | | |
| JP | 2021-116016 A | 8/2021 | | |

* cited by examiner

*Primary Examiner* — Benjamin R Schmitt
(74) *Attorney, Agent, or Firm* — Keating & Bennett, LLP (57) ABSTRACT

A marine vessel maneuvering system includes a controller configured or programmed to perform a water entry determination control to determine whether or not water behind a hull that rises above a water surface due to deceleration of the hull may enter the hull when the hull is decelerating.

20 Claims, 5 Drawing Sheets

⚠ WATER MAY ENTER DUE TO DECELERATION.

FIG.6

|  |  | PITCH ANGLE PA | | |
|---|---|---|---|---|
|  |  | 1 deg. | 2 deg. | 3 deg. |
| HEAVE AMOUNT HV | 5 cm | $S_{11}, d_{11}$ | $S_{21}, d_{21}$ | $S_{31}, d_{31}$ |
|  | 10 cm | $S_{12}, d_{12}$ | $S_{22}, d_{22}$ | $S_{32}, d_{32}$ |
|  | 15 cm | $S_{13}, d_{13}$ | $S_{23}, d_{23}$ | $S_{33}, d_{33}$ |

FIG.7

| | WATER ENTRY DETERMINATION CONTROL |
|---|---|
| HULL IS DECELERATING AND MARINE VESSEL IS IN WATER ENTRY DETERMINATION MODE AND HULL IS DECELERATING FROM SPEED u0 AT WHICH HULL IS IN PLANING STATE AND HULL IS DECELERATING AT DECELERATION GREATER THAN PREDETERMINED DECELERATION THRESHOLD a0 AND HULL IS MOVING FORWARD | PERFORMED |
| HULL IS NOT DECELERATING | NOT PERFORMED |
| MARINE VESSEL IS NOT IN WATER ENTRY DETERMINATION MODE | NOT PERFORMED |
| HULL IS DECELERATING FROM SPEED AT WHICH HULL IS NOT IN PLANING STATE | NOT PERFORMED |
| HULL IS DECELERATING AT DECELERATION EQUAL TO OR LESS THAN PREDETERMINED DECELERATION THRESHOLD a0 | NOT PERFORMED |
| HULL IS NOT MOVING FORWARD | NOT PERFORMED |

FIG.8

MARINE VESSEL MANEUVERING SYSTEM AND MARINE VESSEL

CROSS REFERENCE TO RELATED APPLICATIONS

This application claims the benefit of priority to Japanese Patent Application No. 2022-164035 filed on Oct. 12, 2022. The entire contents of this application are hereby incorporated herein by reference.

BACKGROUND OF THE INVENTION

1. Field of the Invention

The present invention relates to a marine vessel maneuvering system and a marine vessel.

2. Description of the Related Art

A marine vessel including a controller to control the speed of the marine vessel is known in general. Such a marine vessel is disclosed in Japanese Patent Laid-Open No. 2009-286297, for example.

Japanese Patent Laid-Open No. 2009-286297 discloses a marine vessel including a controller to control the speed of the marine vessel. In the marine vessel disclosed in Japanese Patent Laid-Open No. 2009-286297, the controller controls an engine speed to change the speed of the marine vessel according to the wave conditions.

Although not disclosed in Japanese Patent Laid-Open No. 2009-286297, in a conventional marine vessel as disclosed in Japanese Patent Laid-Open No. 2009-286297, the height of a wake (water behind a hull) above the water surface created as the marine vessel sails tends to momentarily become greater than the height of a transom of the hull above the water surface when the hull is decelerated. Furthermore, the wake has a velocity component at the moment the wake is created in a horizontal direction for a certain period of time, and thus the water behind the hull that has momentarily risen above the transom of the hull may enter the hull when the hull is decelerated. In such a case, the interior of the hull and a passenger of the marine vessel get wet. Therefore, it is desired to reduce or prevent entry of the water behind the hull into the hull when the hull is decelerating.

SUMMARY OF THE INVENTION

Preferred embodiments of the present invention provide marine vessel maneuvering systems and marine vessels that each reduce or prevent entry of water behind hulls into the hulls when the hulls decelerate.

A marine vessel maneuvering system according to a preferred embodiment of the present invention includes a hull, and a controller configured or programmed to control a speed of the hull. The controller is configured or programmed to perform a water entry determination control to determine whether or not water behind the hull that rises above a water surface due to deceleration of the hull may enter the hull when the hull is decelerating, and perform a notification control to notify a vessel operator that the water behind the hull may enter the hull due to the deceleration of the hull when it is determined that the water behind the hull may enter the hull.

In a marine vessel maneuvering system according to a preferred embodiment of the present invention, the controller is configured or programmed to perform the water entry determination control to determine whether or not the water behind the hull that rises above the water surface due to the deceleration of the hull may enter the hull when the hull is decelerating. Accordingly, measures are taken to prevent the water behind the hull from entering the hull due to the deceleration of the hull based on the result of the water entry determination. Consequently, entry of the water behind the hull into the hull is reduced or prevented when the hull is decelerating. Furthermore, the controller is configured or programmed to perform the notification control to notify the vessel operator that the water behind the hull may enter the hull due to the deceleration of the hull when it is determined that the water behind the hull may enter the hull. Accordingly, the notification control allows the vessel operator to recognize that the water behind the hull may enter the hull due to the deceleration of the hull, and thus the vessel operator is prompted to take measures to prevent the water behind the hull from entering the hull due to the deceleration of the hull.

In a marine vessel maneuvering system according to a preferred embodiment of the present invention, the controller is preferably configured or programmed to perform the water entry determination control based on a height of the water behind the hull that rises above the water surface due to the deceleration of the hull and a height of a transom of the hull above the water surface. When the hull is decelerating, and the height of the water behind the hull that rises above the water surface due to the deceleration of the hull is greater than the height of the transom of the hull above the water surface, the water behind the hull that rises above the water surface due to the deceleration of the hull will enter the hull. Accordingly, with the structure described above, it is easily determined whether or not the water behind the hull that rises above the water surface due to the deceleration of the hull will enter the hull based on the height of the water behind the hull that rises above the water surface due to the deceleration of the hull and the height of the transom of the hull above the water surface when the hull is decelerating.

In such a case, the controller is preferably configured or programmed to acquire the height of the water behind the hull that rises above the water surface due to the deceleration of the hull based on a volume of the water behind the hull that rises above the water surface due to the deceleration of the hull. The volume of the water behind the hull that rises above the water surface due to the deceleration of the hull corresponds to the cube of the height of the water behind the hull that rises above the water surface due to the deceleration of the hull. Accordingly, with the structure described above, the height of the water behind the hull that rises above the water surface due to the deceleration of the hull is easily acquired based on the volume of the water behind the hull that rises above the water surface due to the deceleration of the hull, which corresponds to the cube of the height of the water behind the hull that rises above the water surface due to the deceleration of the hull.

In a marine vessel maneuvering system including the controller configured or programmed to acquire the height of the water behind the hull that rises above the water surface due to the deceleration of the hull based on the volume of the water behind the hull that rises above the water surface due to the deceleration of the hull, the controller is preferably configured or programmed to acquire the volume of the water behind the hull that rises above the water surface due to the deceleration of the hull based on an area of the transom below the water surface and the speed of the hull, and acquire the height of the transom above the water surface based on a height of the transom and a depth of the transom below the water surface. The volume of the water behind the hull that rises above the water surface due to the deceleration of the hull corresponds to the product of the area of the transom below the water surface and the speed of the hull. Furthermore, a difference between the height of the transom and the depth of the transom below the water surface corresponds to the height of the transom above the water surface. Accordingly, with the structure described above, the volume of the water behind the hull that rises above the water surface due to the deceleration of the hull, which corresponds to the product of the area of the transom below the water surface and the speed of the hull, is easily acquired based on the area of the transom below the water surface and the speed of the hull. Furthermore, the height of the transom above the water surface, which corresponds to the difference between the height of the transom and the depth of the transom below the water surface, is easily acquired based on the height of the transom and the depth of the transom below the water surface.

In such a case, the controller is preferably configured or programmed to acquire the area of the transom below the water surface and the depth of the transom below the water surface based on an amount of upward-downward deviation of the hull from a reference position (hereinafter "a heave amount") and a pitch angle representing a forward-rearward tilt of the hull. The area of the transom below the water surface and the depth of the transom below the water surface correlate with the heave amount and the pitch angle. Accordingly, with the structure described above, the area of the transom below the water surface and the depth of the transom below the water surface are easily acquired based on the heave amount and the pitch angle with which the area of the transom below the water surface and the depth of the transom below the water surface correlate.

In a marine vessel maneuvering system including the controller configured or programmed to acquire the area of the transom below the water surface and the depth of the transom below the water surface based on the heave amount and the pitch angle, the controller is preferably configured or programmed to acquire the area of the transom below the water surface and the depth of the transom below the water surface based on information acquired in advance for the hull and representing a correlation between both the heave amount and the pitch angle and the area of the transom below the water surface and a correlation between both the heave amount and the pitch angle and the depth of the transom below the water surface. Accordingly, based on the information representing the correlations acquired in advance for the hull, the area of the transom below the water surface and the depth of the transom below the water surface are quickly acquired without acquiring the correlations described above each time the water entry determination control is performed.

In a marine vessel maneuvering system including the controller configured or programmed to acquire the area of the transom below the water surface and the depth of the transom below the water surface based on the heave amount and the pitch angle, the controller is preferably configured or programmed to acquire the heave amount with at least one of a global satellite positioning system, a water pressure sensor, or a water depth sensor, and acquire the pitch angle with at least one of a gyro sensor or an acceleration sensor. Accordingly, the heave amount is accurately acquired with at least one of the global satellite positioning system, the water pressure sensor, or the water depth sensor. Furthermore, the pitch angle is accurately acquired with at least one of the gyro sensor or the acceleration sensor.

In a marine vessel maneuvering system including the controller configured or programmed to acquire the area of the transom below the water surface and the depth of the transom below the water surface based on the heave amount and the pitch angle, the controller is preferably configured or programmed to acquire the heave amount and the pitch angle based on the speed of the hull and a shape of the hull. Accordingly, the heave amount and the pitch angle are easily acquired based on the speed and shape of the hull.

A marine vessel maneuvering system according to a preferred embodiment of the present invention preferably further includes a display to display the speed of the hull, and the controller is preferably configured or programmed to perform the notification control to notify the vessel operator by displaying on the display that the water behind the hull may enter the hull due to the deceleration of the hull when it is determined that the water behind the hull may enter the hull. Accordingly, the information displayed on the display by the notification control that the water behind the hull may enter the hull due to the deceleration of the hull allows the vessel operator to easily visually recognize that the water behind the hull may enter the hull due to the deceleration of the hull.

In a marine vessel maneuvering system according to a preferred embodiment of the present invention, the controller is preferably configured or programmed to perform the water entry determination control when the hull is decelerating from a speed at which the hull is in a planing state. When the hull is decelerated to change from the planing state to a non-planing state, the depth of the transom below the water surface momentarily becomes particularly large, and thus the height of the water behind the hull that rises above the water surface momentarily increases. Thus, the water is likely to enter the hull from behind. Accordingly, with the structure described above, when the water is particularly likely to enter the hull from behind, such as when the hull is decelerating from the speed at which the hull is in the planing state, the water entry determination control is performed such that entry of the water behind the hull into the hull is effectively reduced or prevented when the hull is decelerating.

In a marine vessel maneuvering system according to a preferred embodiment of the present invention, the controller is preferably configured or programmed to perform the water entry determination control when the hull is decelerating at a deceleration greater than a predetermined deceleration threshold. When the height of the water behind the hull that rises above the water surface due to the deceleration of the hull becomes greater than the height of the transom of the hull above the water surface, the amount of water that may enter the hull from behind increases as the deceleration of the hull increases. Accordingly, with the structure described above, when the amount of water that may enter the hull from behind is likely to increase, such as when the hull is decelerating at the deceleration greater than the predetermined deceleration threshold, the water entry determination control is performed such that entry of the water behind the hull into the hull is effectively reduced or prevented when the hull is decelerating.

In a marine vessel maneuvering system according to a preferred embodiment of the present invention, the controller is preferably configured or programmed to perform the water entry determination control when the hull is moving forward while decelerating. When the hull is moving forward, the vessel operator maneuvers a marine vessel while paying attention mainly to the front of the hull, and thus it is difficult for the vessel operator to know the situation behind the hull. Accordingly, with the structure described above, when it is difficult for the vessel operator to know the situation behind the hull, such as when the hull is moving forward, the water entry determination control is performed such that entry of the water behind the hull into the hull is effectively reduced or prevented when the hull is decelerating.

In a marine vessel maneuvering system according to a preferred embodiment of the present invention, the controller is preferably configured or programmed to perform the water entry determination control when the hull is decelerating, and the marine vessel is in a water entry determination mode in which the water entry determination control is performed. Accordingly, when the water entry determination control is desired, the marine vessel is operated to enter the water entry determination mode such that the water entry determination control is performed. When the water entry determination control is not desired, the marine vessel is operated to not enter the water entry determination mode such that the water entry determination control is not performed.

In a marine vessel maneuvering system including the controller configured or programmed to perform the water entry determination control based on the height of the water behind the hull that rises above the water surface due to the deceleration of the hull and the height of the transom of the hull above the water surface, the controller is preferably configured or programmed to perform the water entry determination control based on a height of waves around the hull in addition to the height of the water behind the hull that rises above the water surface due to the deceleration of the hull and the height of the transom above the water surface. When the waves around the hull move violently, the height of the waves around the hull influences the possibility of entry of the water behind the hull into the hull due to the deceleration of the hull. Accordingly, with the structure described above, even when the waves around the hull move violently, it is easily determined whether or not the water behind the hull that rises above the water surface due to the deceleration of the hull may enter the hull based on the height of the waves around the hull in addition to the height of the water behind the hull that rises above the water surface due to the deceleration of the hull and the height of the transom of the hull above the water surface.

A marine vessel maneuvering system according to a preferred embodiment of the present invention includes a hull, and a controller configured or programmed to control a speed of the hull. The controller is configured or programmed to perform a water entry determination control to determine whether or not water behind the hull that rises above a water surface due to deceleration of the hull may enter the hull when the hull is decelerating.

In a marine vessel maneuvering system according to a preferred embodiment of the present invention, the controller is configured or programmed to perform the water entry determination control to determine whether or not the water behind the hull that rises above the water surface due to the deceleration of the hull may enter the hull when the hull is decelerating. Accordingly, similarly to the marine vessel maneuvering systems according to preferred embodiments of the present invention described above, measures are taken to prevent the water behind the hull from entering the hull due to the deceleration of the hull based on the result of the water entry determination. Consequently, similarly to the marine vessel maneuvering systems according to preferred embodiments of the present invention described above, entry of the water behind the hull into the hull is reduced or prevented when the hull is decelerating.

In a marine vessel maneuvering system according to a preferred embodiment of the present invention, the controller is preferably configured or programmed to perform an obstacle determination control to determine whether or not an obstacle exists in front of the hull, and perform an acceleration change control to reduce a deceleration of the hull, maintain the speed of the hull constant, or increase the speed of the hull in order to prevent the water behind the hull from entering the hull when it is determined that the water behind the hull may enter the hull and when it is determined that an obstacle does not exist in front of the hull. Accordingly, when it is determined that the water behind the hull may enter the hull and it is determined that an obstacle does not exist in front of the hull, the acceleration change control is performed to prevent the water behind the hull from entering the hull, and thus a vessel operator does not need to take measures to prevent the water behind the hull from entering the hull due to the deceleration of the hull.

A marine vessel according to a preferred embodiment of the present invention includes a hull, and a controller configured or programmed to control a speed of the hull. The controller is configured or programmed to perform a water entry determination control to determine whether or not water behind the hull that rises above a water surface due to deceleration of the hull may enter the hull when the hull is decelerating, and perform a notification control to notify a vessel operator that the water behind the hull may enter the hull due to the deceleration of the hull when it is determined that the water behind the hull may enter the hull.

In a marine vessel according to a preferred embodiment of the present invention, the controller is configured or programmed to perform the water entry determination control to determine whether or not the water behind the hull that rises above the water surface due to the deceleration of the hull may enter the hull when the hull is decelerating. Accordingly, similarly to the marine vessel maneuvering systems according to preferred embodiments of the present invention described above, measures are taken to prevent the water behind the hull from entering the hull due to the deceleration of the hull based on the result of the water entry determination. Consequently, similarly to the marine vessel maneuvering systems according to preferred embodiments of the present invention described above, entry of the water behind the hull into the hull is reduced or prevented when the hull is decelerating. Furthermore, the controller is configured or programmed to perform the notification control to notify the vessel operator that the water behind the hull may enter the hull due to the deceleration of the hull when it is determined that the water behind the hull may enter the hull. Accordingly, similarly to the marine vessel maneuvering systems according to preferred embodiments of the present invention described above, the notification control allows the vessel operator to recognize that the water behind the hull may enter the hull due to the deceleration of the hull, and thus the vessel operator is prompted to take measures to prevent the water behind the hull from entering the hull due to the deceleration of the hull.

In a marine vessel according to a preferred embodiment of the present invention, the controller is preferably configured or programmed to perform the water entry determination control based on a height of the water behind the hull that rises above the water surface due to the deceleration of the hull and a height of a transom of the hull above the water surface. Accordingly, similarly to the marine vessel maneuvering systems according to preferred embodiments of the present invention described above, it is easily determined whether or not the water behind the hull that rises above the water surface due to the deceleration of the hull may enter the hull based on the height of the water behind the hull that rises above the water surface due to the deceleration of the hull and the height of the transom of the hull above the water surface when the hull is decelerating.

In such a case, the controller is preferably configured or programmed to acquire the height of the water behind the hull that rises above the water surface due to the deceleration of the hull based on a volume of the water behind the hull that rises above the water surface due to the deceleration of the hull. Accordingly, similarly to the marine vessel maneuvering systems according to preferred embodiments of the present invention described above, the height of the water behind the hull that rises above the water surface due to the deceleration of the hull is easily acquired based on the volume of the water behind the hull that rises above the water surface due to the deceleration of the hull, which corresponds to the cube of the height of the water behind the hull that rises above the water surface due to the deceleration of the hull.

In a marine vessel including the controller configured or programmed to acquire the height of the water behind the hull that rises above the water surface due to the deceleration of the hull based on the volume of the water behind the hull that rises above the water surface due to the deceleration of the hull, the controller is preferably configured or programmed to acquire the volume of the water behind the hull that rises above the water surface due to the deceleration of the hull based on an area of the transom below the water surface and the speed of the hull, and acquire the height of the transom above the water surface based on a height of the transom and a depth of the transom below the water surface. Accordingly, similarly to the marine vessel maneuvering systems according to preferred embodiments of the present invention described above, the volume of the water behind the hull that rises above the water surface due to the deceleration of the hull, which corresponds to the product of the area of the transom below the water surface and the speed of the hull, is easily acquired based on the area of the transom below the water surface and the speed of the hull. Furthermore, similarly to the marine vessel maneuvering systems according to preferred embodiments of the present invention described above, the height of the transom above the water surface, which corresponds to the difference between the height of the transom and the depth of the transom below the water surface, is easily acquired based on the height of the transom and the depth of the transom below the water surface.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

A marine vessel maneuvering system 100 and a marine vessel 110 according to preferred embodiments of the present invention are now described with reference to FIGS. 1 to 7. In the figures, arrow FWD represents the forward direction of the marine vessel 110, arrow BWD represents the rearward direction of the marine vessel 110, arrow L represents the left direction (portside direction) of the marine vessel 110, and arrow R represents the right direction (starboard direction) of the marine vessel 110.

Figure 1:
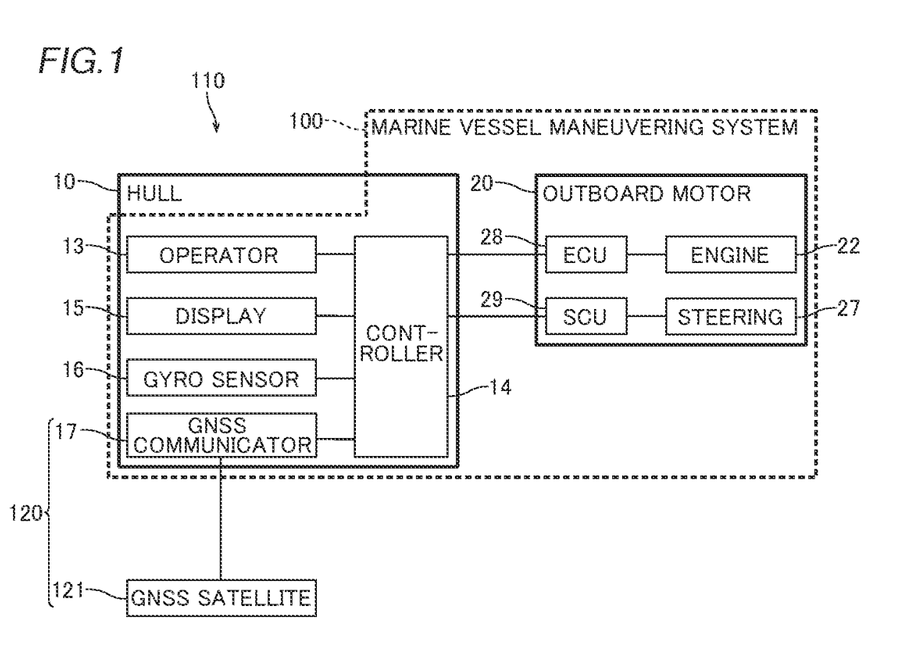
FIG. 1 is a block diagram of a marine vessel maneuvering system according to a preferred embodiment of the present invention.

As shown in FIG. 1, the marine vessel maneuvering system 100 is provided on or in the marine vessel 110. The marine vessel maneuvering system 100 maneuvers the marine vessel 110. The marine vessel 110 may be a relatively small marine vessel used for sightseeing or fishing, for example.

Figure 2:
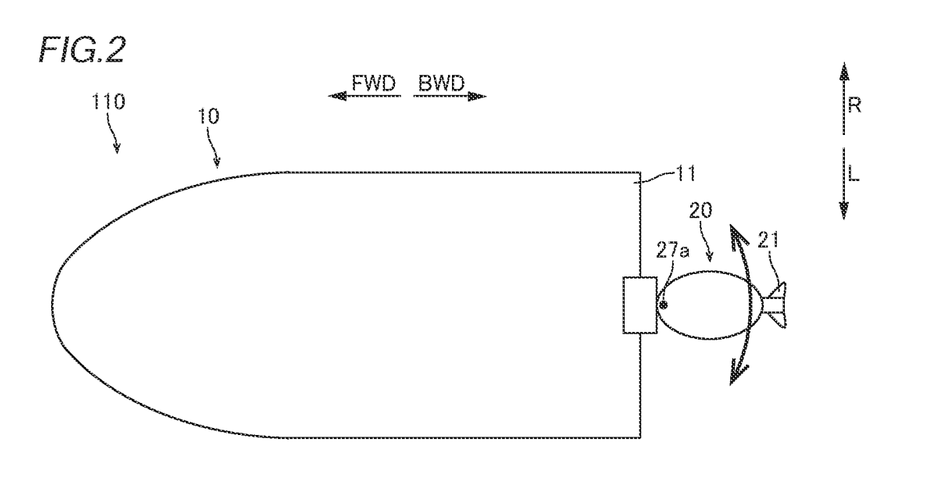
FIG. 2 is a schematic view of a marine vessel according to a preferred embodiment of the present invention.

The marine vessel maneuvering system 100 (marine vessel 110) includes a hull 10 and an outboard motor 20. As shown in FIG. 2, only one outboard motor 20 is attached to a stern 11 of the hull 10.

As shown in FIG. 1, the hull 10 includes an operator 13, a controller 14, a display 15, a gyro sensor 16, and a global navigation satellite system (GNSS) communicator 17.

The operator 13 receive a user's operation to steer (maneuver) the marine vessel 110. The operator 13 includes a remote control, a steering wheel, and a joystick. The operator 13 receives an operation to set a navigation mode of the marine vessel 110. The navigation mode of the marine vessel 110 includes an automatic navigation mode in which the marine vessel 110 automatically navigates toward a target position set by a vessel operator of the marine vessel 110, for example, a water entry determination mode described below, etc.

The controller 14 controls an engine control unit (ECU) 28 and a steering control unit (SCU) 29 of the outboard motor 20 based on an operation on the operator 13. The controller 14 includes a control circuit including a central processing unit (CPU), a read-only memory (ROM), a random access memory (RAM), etc.

The display 15 displays information on the marine vessel 110. The information on the marine vessel 110 includes the speed u (see FIG. 4) of the marine vessel 110, the rotation speed of an engine 22 of the outboard motor 20, the shift state of the outboard motor 20, and the navigation mode of the marine vessel 110, for example. The display 15 is a liquid crystal display, for example. The display 15 may be a touch panel. In such a case, instead of the operator 13, the display 15, which is a touch panel, may receive a user's operation to steer (maneuver) the marine vessel 110.

The gyro sensor 16 acquires information on the attitude of the hull 10. The controller 14 acquires a pitch angle PA (see FIG. 6) representing the forward-rearward tilt of the hull 10 based on the information detected by the gyro sensor 16, for example. That is, the controller 14 acquires the pitch angle PA with the gyro sensor 16.

A global satellite positioning system 120 includes the GNSS communicator 17 and a GNSS satellite 121. The GNSS communicator 17 is communicable with the GNSS satellite 121. The controller 14 acquires position information on the hull 10, the speed u (see FIG. 4) of the hull 10, a heave amount HV (see FIG. 6) representing the amount of upward-downward deviation of the hull 10 from a reference position, etc. based on the information communicated with the GNSS satellite 121 via the GNSS communicator 17. That is, the controller 14 acquires the heave amount HV with the global satellite positioning system 120.

Figure 3:
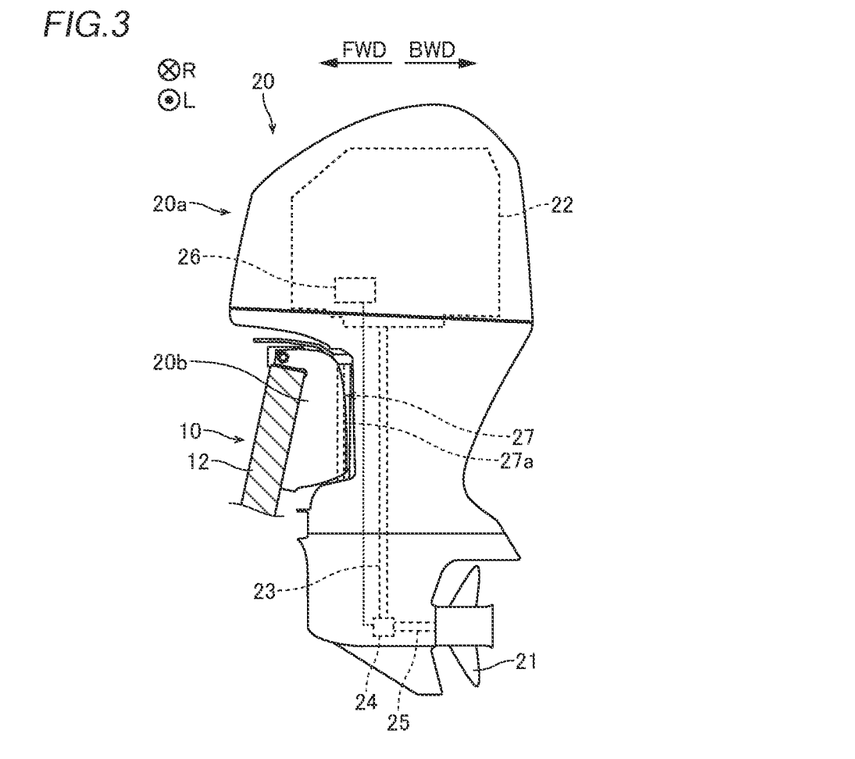
FIG. 3 is a side view showing an outboard motor of a marine vessel according to a preferred embodiment of the present invention.

As shown in FIG. 3, the outboard motor 20 includes an outboard motor body 20a and a bracket 20b. The outboard motor body 20a is attached to a transom 12 provided at the stern 11 of the hull 10 via the bracket 20b.

The outboard motor 20 includes the engine 22 to drive a propeller 21 to generate a thrust. That is, the outboard motor 20 is an engine outboard motor including the engine 22 to drive the propeller 21. Specifically, the outboard motor body 20a includes the engine 22, a drive shaft 23, a gearing 24, a propeller shaft 25, and the propeller 21. The engine 22 is an internal combustion engine that generates a driving force. The driving force of the engine 22 is transmitted to the propeller 21 via the drive shaft 23, the gearing 24, and the propeller shaft 25. The propeller 21 generates a propulsive force to propel the marine vessel 110 (see FIG. 2) by rotating in the water by the driving force transmitted from the engine 22.

The outboard motor body 20a includes a shift actuator 26 to switch the shift state of the outboard motor 20. The shift actuator 26 switches the shift state of the outboard motor 20 between a forward movement state, a reverse movement state, and a neutral state by switching the meshing of the gearing 24. In the forward movement state, a driving force is transmitted from the engine 22 to the propeller 21 to generate a forward thrust from the propeller 21. In the reverse movement state, a driving force is transmitted from the engine 22 to the propeller 21 to generate a reverse thrust from the propeller 21. In the neutral state, a driving force is not transmitted from the engine 22 to the propeller 21 to not generate a thrust in the propeller 21.

The outboard motor 20 includes a steering 27 to change the direction of the propulsive force of the propeller 21 so as to change the traveling direction of the marine vessel 110 (see FIG. 2). Specifically, the steering 27 is provided on the bracket 20b. The steering 27 includes a steering shaft 27a that extends in an upward-downward direction. The outboard motor body 20a is rotated in a right-left direction by the steering 27 about the steering shaft 27a with respect to the bracket 20b. When the outboard motor body 20a rotates in the right-left direction about the steering shaft 27a, the orientation of the propeller 21 also rotates in the right-left direction. Thus, the direction of the propulsive force of the propeller 21 is changed. That is, the outboard motor 20 is steered.

As shown in FIG. 1, the outboard motor 20 includes the ECU 28 and the SCU 29. The ECU 28 controls driving of the engine 22 and driving of the shift actuator 26 (see FIG. 3) based on control by the controller 14. That is, the controller 14 controls the speed u (see FIG. 4) of the hull 10 by controlling driving of the engine 22 via the ECU 28 to change the propulsive force of the propeller 21. The SCU 29 controls driving of the steering 27 based on control by the controller 14. Each of the ECU 28 and the SCU 29 includes a control circuit including a CPU, a ROM, a RAM, etc.

Figure 4:
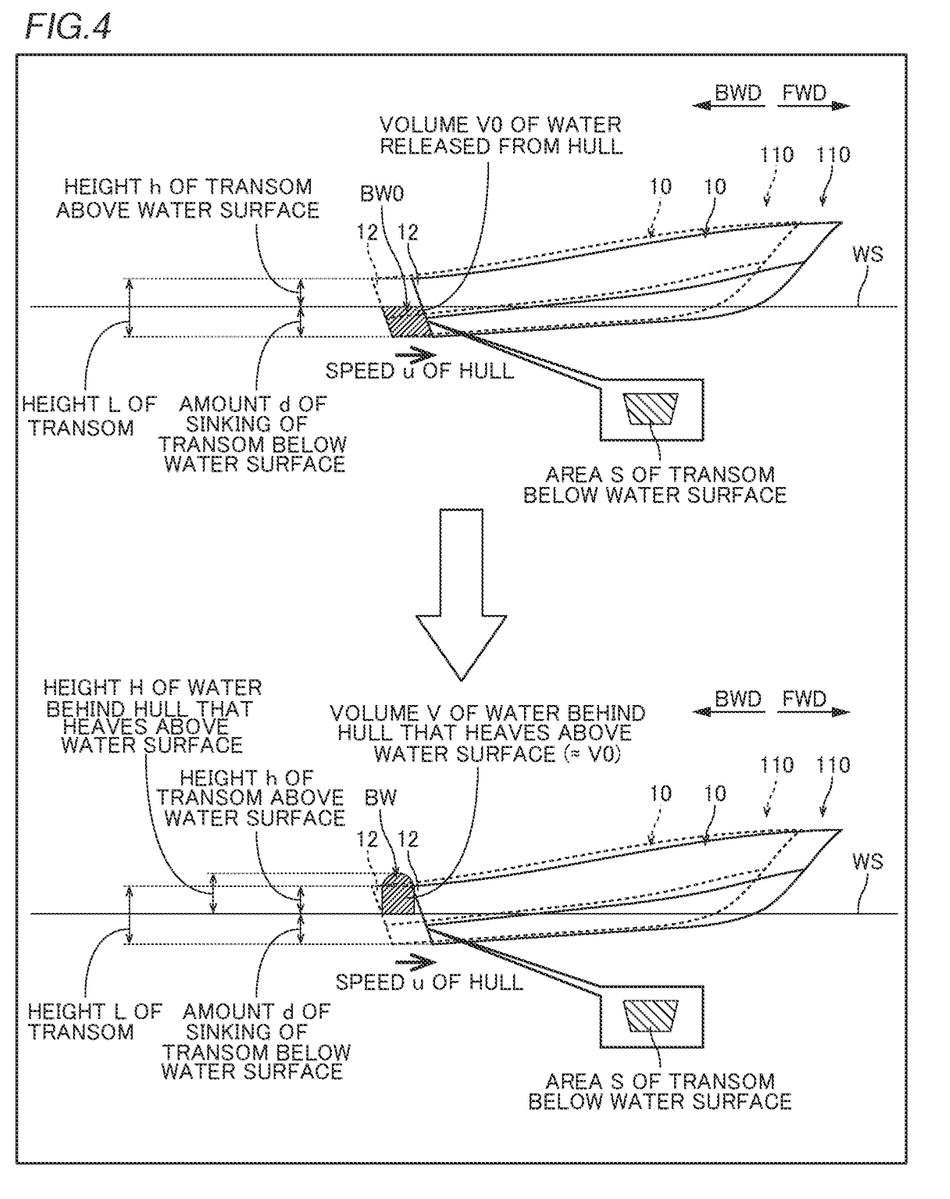
FIG. 4 is a schematic view illustrating a water entry determination control of a marine vessel maneuvering system according to a preferred embodiment of the present invention.

As shown in FIG. 4, the height of a wave (water BW behind the hull 10) above the water surface WS created as the marine vessel 110 sails tends to momentarily become greater than the height h of the transom 12 of the hull 10 above the water surface WS when the hull 10 is decelerated. Specifically, as the hull 10 moves in the forward direction, surrounding water tends to flow into a space behind the hull 10 in which the hull 10 existed immediately before. Then, water BW0 behind the hull 10 rises above the water surface WS due to the momentum of the surrounding water that is about to flow in. When the hull 10 is decelerating, the water BW0 behind the hull 10 tends to rise above the water surface WS due to the fact that the volume of the hull 10 below the water surface WS increases as the speed u of the hull 10 decreases. Furthermore, a wake has a velocity component at the moment the wake is created in a horizontal direction for a certain period of time, and thus the water BW behind the hull 10 of which the height has momentarily become greater than the height h of the transom 12 of the hull 10 above the water surface WS may enter the hull 10 when the hull is decelerated. In such a case, the interior of the hull 10 and the passenger of the marine vessel 110 get wet.

Figure 5:
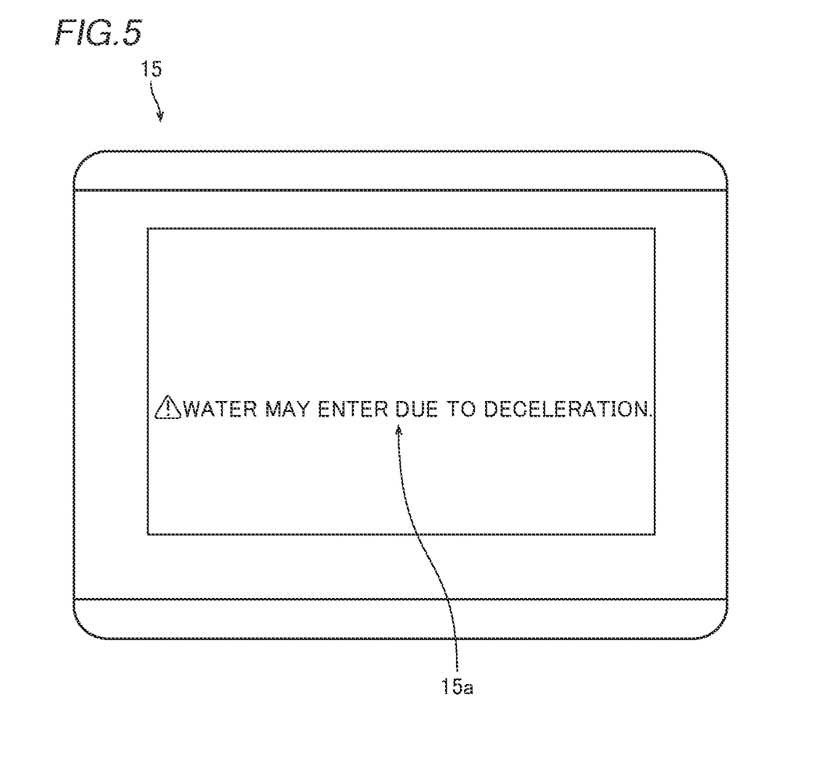
FIG. 5 is a diagram illustrating a notification control of a marine vessel maneuvering system according to a preferred embodiment of the present invention.

On the other hand, in the marine vessel maneuvering system 100 (see FIG. 1), the following water entry determination control and notification control are performed in order to reduce or prevent entry of the water BW behind the hull 10 into the hull 10 when the hull 10 is decelerating. Specifically, the controller 14 (see FIG. 1) performs the water entry determination control to determine whether or not the water BW behind the hull 10 that rises above the water surface WS due to deceleration of the hull 10 may enter the hull 10 when the hull 10 is decelerating. Furthermore, as shown in FIG. 5, when it is determined that the water BW behind the hull 10 may enter the hull 10, the controller 14 performs the notification control to notify a vessel operator by displaying on the display 15 that the water BW behind the hull 10 may enter the hull 10 due to deceleration of the hull 10. FIG. 5 shows an example in which the display 15 displays a message 15a indicating that the water BW behind the hull 10 may enter the hull 10 due to deceleration of the hull 10, but a mark, for example, may be displayed.

As shown in FIG. 4, the controller 14 (see FIG. 1) performs the water entry determination control based on the height H of the water BW behind the hull 10 that rises above the water surface WS due to deceleration of the hull 10 and the height h of the transom 12 of the hull 10 above the water surface WS. Specifically, the controller 14 determines that the water BW behind the hull 10 that rises above the water surface WS due to deceleration of the hull 10 may enter the hull 10 when the height H of the water BW behind the hull 10 that rises above the water surface WS due to deceleration of the hull 10 becomes greater than the height h of the transom 12 of the hull 10 above the water surface WS.

The controller 14 (see FIG. 1) acquires the height H of the water BW behind the hull 10 that rises above the water surface WS due to deceleration of the hull 10 based on the volume V per unit time of the water BW behind the hull 10 that rises above the water surface WS due to deceleration of the hull 10. Specifically, the controller 14 acquires the height H of the water BW behind the hull 10 that rises above the water surface WS due to deceleration of the hull 10 by raising the volume V per unit time of the water BW behind the hull 10 that rises above the water surface WS due to deceleration of the hull 10 to the power of $\frac{1}{3}$. It is assumed that the volume V per unit time of the water BW behind the hull 10 that rises above the water surface WS is equal or substantially equal to the volume V0 per unit time of the water BW0 behind the hull 10 released from the hull 10.

The controller 14 (see FIG. 1) acquires the volume V per unit time of the water BW behind the hull 10 that rises above the water surface WS due to deceleration of the hull 10 based on the area S of the transom 12 below the water surface WS and the speed u of the hull 10. Specifically, the controller 14 acquires the volume V per unit time of the water BW behind the hull 10 that rises above the water surface WS due to deceleration of the hull 10 by multiplying the area S of the transom 12 below the water surface WS by the speed u of the hull 10.

The controller 14 (see FIG. 1) acquires the height h of the transom 12 above the water surface WS based on the height L of the transom 12 and the depth d of the transom 12 below the water surface WS. Specifically, the controller 14 acquires the height h of the transom 12 above the water surface WS by subtracting the depth d of the transom 12 below the water surface WS from the height L of the transom 12.

Figure 6:
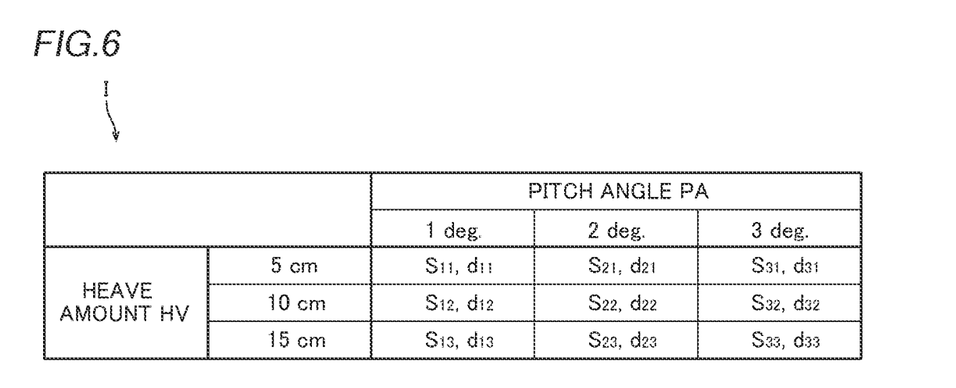
FIG. 6 is a diagram showing information representing a correlation between both a heave amount and a pitch angle and the area of a transom below a water surface and a correlation between both a heave amount and a pitch angle and the depth of the transom below the water surface in a marine vessel maneuvering system according to a preferred embodiment of the present invention.

As shown in FIG. 6, the controller 14 (see FIG. 1) acquires the area S of the transom 12 (see FIG. 4) below the water surface WS (see FIG. 4) and the depth d of the transom 12 below the water surface WS based on the heave amount HV and the pitch angle PA. Specifically, the controller 14 acquires the area S of the transom 12 below the water surface WS and the depth d of the transom 12 below the water surface WS based on information I acquired in advance for the hull 10 (see FIG. 4) and representing a correlation between both the heave amount HV and pitch angle PA and the area S of the transom 12 below the water surface WS and a correlation between both the heave amount HV and pitch angle PA and the depth d of the transom 12 below the water surface WS. FIG. 6 shows an example in which the information I representing the correlations is in the manner of a table, but the information I representing the correlations may be in the manner of a map or a formula.

Figure 7:
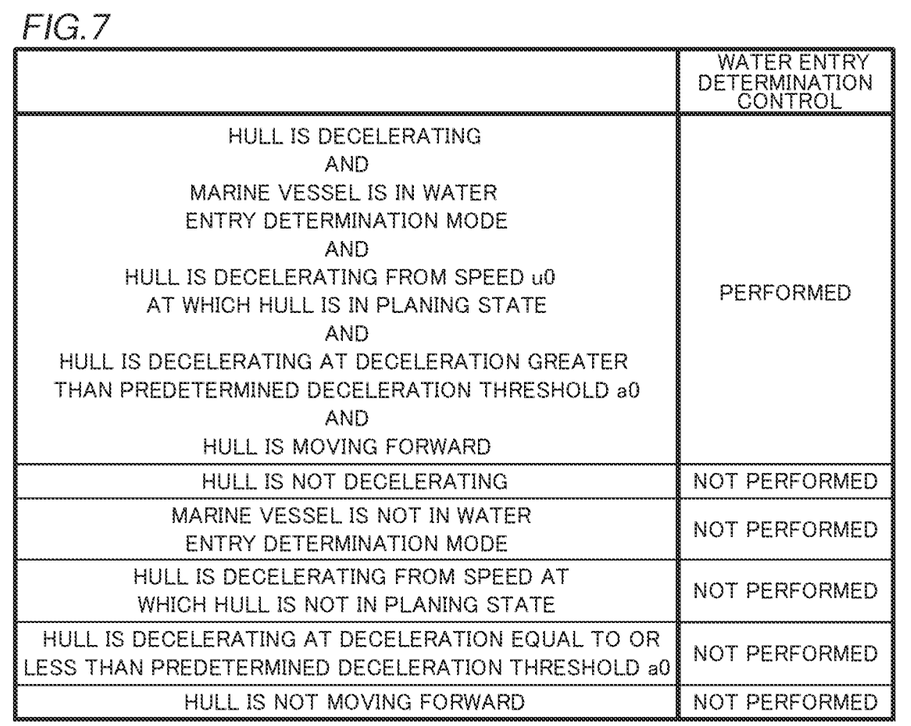
FIG. 7 is a diagram showing conditions in which a water entry determination control is performed in a marine vessel maneuvering system according to a preferred embodiment of the present invention.

As shown in FIG. 7, the controller 14 (see FIG. 1) performs the water entry determination control when the marine vessel 110 is in the water entry determination mode in which the water entry determination control is performed, and the hull 10 is moving forward while decelerating from a speed u0 at which the hull 10 is in a planing state at a deceleration greater than a predetermined deceleration threshold a0. On the other hand, the controller 14 does not perform the water entry determination control at least when the hull 10 is not decelerating, when the marine vessel 110 is not in the water entry determination mode in which the water entry determination control is performed, when the hull 10 is decelerating from a speed at which the hull 10 is not in the planing state, when the hull 10 is decelerating at a deceleration equal to or less than the predetermined deceleration threshold a0, or when the hull 10 is not moving forward. The speed u0 at which the hull 10 is in the planing state and the predetermined deceleration threshold a0 are acquired in advance for the hull 10.

According to the various preferred embodiments of the present invention described above, the following advantageous effects are achieved.

According to a preferred embodiment of the present invention, the controller 14 is configured or programmed to perform the water entry determination control to determine whether or not the water BW behind the hull 10 that rises above the water surface WS due to deceleration of the hull 10 may enter the hull 10 when the hull 10 is decelerating. Accordingly, measures are taken to prevent the water BW behind the hull 10 from entering the hull 10 due to deceleration of the hull 10 based on the result of water entry determination. Consequently, entry of the water BW behind the hull 10 into the hull 10 is reduced or prevented when the hull 10 is decelerating. Furthermore, the controller 14 performs the notification control to notify the vessel operator that the water BW behind the hull 10 may enter the hull 10 due to deceleration of the hull 10 when it is determined that the water BW behind the hull 10 may enter the hull 10. Accordingly, the notification control allows the vessel operator to recognize that the water BW behind the hull 10 may enter the hull 10 due to deceleration of the hull 10, and thus the vessel operator is prompted to take measures to prevent the water BW behind the hull 10 from entering the hull 10 due to deceleration of the hull 10.

According to a preferred embodiment of the present invention, the controller 14 is configured or programmed to perform the water entry determination control based on the height H of the water BW behind the hull 10 that rises above the water surface WS due to deceleration of the hull 10 and the height h of the transom 12 of the hull 10 above the water surface WS. When the hull 10 is decelerating, and the height H of the water BW behind the hull 10 that rises above the water surface WS due to deceleration of the hull 10 is greater than the height h of the transom 12 of the hull 10 above the water surface WS, the water BW behind the hull 10 that rises above the water surface WS due to deceleration of the hull 10 may enter the hull 10. Accordingly, it is easily determined whether or not the water BW behind the hull 10 that rises above the water surface WS due to deceleration of the hull 10 may enter the hull 10 based on the height H of the water BW behind the hull 10 that rises above the water surface due to deceleration of the hull 10 and the height h of the transom 12 of the hull 10 above the water surface WS when the hull 10 is decelerating.

According to a preferred embodiment of the present invention, the controller 14 is configured or programmed to acquire the height H of the water BW behind the hull 10 that rises above the water surface WS due to deceleration of the hull 10 based on the volume V of the water BW behind the hull 10 that rises above the water surface WS due to deceleration of the hull 10. The volume V of the water BW behind the hull 10 that rises above the water surface WS due to deceleration of the hull 10 corresponds to the cube of the height H of the water BW behind the hull 10 that rises above the water surface WS due to deceleration of the hull 10. Accordingly, the height H of the water BW behind the hull 10 that rises above the water surface WS due to deceleration of the hull 10 is easily acquired based on the volume V of the water BW behind the hull 10 that rises above the water surface WS due to deceleration of the hull 10, which corresponds to the cube of the height H of the water BW behind the hull 10 that rises above the water surface WS due to deceleration of the hull 10.

According to a preferred embodiment of the present invention, the controller 14 is configured or programmed to acquire the volume V of the water BW behind the hull 10 that rises above the water surface WS due to deceleration of the hull 10 based on the area S of the transom 12 below the water surface WS and the speed u of the hull 10. Furthermore, the controller 14 is configured or programmed to acquire the height h of the transom 12 above the water surface WS based on the height L of the transom 12 and the depth d of the transom 12 below the water surface WS. The volume V of the water BW behind the hull 10 that rises above the water surface WS due to deceleration of the hull 10 corresponds to the product of the area S of the transom 12 below the water surface WS and the speed u of the hull 10. Furthermore, a difference between the height L of the transom 12 and the depth d of the transom 12 below the water surface WS corresponds to the height h of the transom 12 above the water surface WS. Accordingly, the volume V of the water BW behind the hull 10 that rises above the water surface WS due to deceleration of the hull 10, which corresponds to the product of the area S of the transom 12 below the water surface WS and the speed u of the hull 10, is easily acquired based on the area S of the transom 12 below the water surface WS and the speed u of the hull 10. Furthermore, the height h of the transom 12 above the water surface WS, which corresponds to the difference between the height L of the transom 12 and the depth d of the transom 12 below the water surface WS, is easily acquired based on the height L of the transom 12 and the depth d of the transom 12 below the water surface WS.

According to a preferred embodiment of the present invention, the controller 14 is configured or programmed to acquire the area S of the transom 12 below the water surface WS and the depth d of the transom 12 below the water surface WS based on the heave amount HV representing the amount of upward-downward deviation of the hull 10 from the reference position and the pitch angle PA representing the forward-rearward tilt of the hull 10. The area S of the transom 12 below the water surface WS and the depth d of the transom 12 below the water surface WS correlate with the heave amount HV and the pitch angle PA. Accordingly, the area S of the transom 12 below the water surface WS and the depth d of the transom 12 below the water surface WS are easily acquired based on the heave amount HV and the pitch angle PA with which the area S of the transom 12 below the water surface WS and the depth d of the transom 12 below the water surface WS correlate.

According to a preferred embodiment of the present invention, the controller 14 is configured or programmed to acquire the area S of the transom 12 below the water surface WS and the depth d of the transom 12 below the water surface WS based on the information I acquired in advance for the hull 10 and representing the correlation between both the heave amount HV and the pitch angle PA and the area S of the transom 12 below the water surface WS and the correlation between both the heave amount HV and the pitch angle PA and the depth d of the transom 12 below the water surface WS. Accordingly, based on the information I representing the correlations acquired in advance for the hull 10, the area S of the transom 12 below the water surface WS and the depth d of the transom 12 below the water surface WS are quickly acquired without acquiring the correlations described above each time the water entry determination control is performed.

According to a preferred embodiment of the present invention, the controller 14 is configured or programmed to acquire the heave amount HV with the global satellite positioning system 120, and the pitch angle PA with the gyro sensor 16. Accordingly, the heave amount HV is accurately acquired with the global satellite positioning system 120, and the pitch angle PA is accurately acquired with the gyro sensor 16.

According to a preferred embodiment of the present invention, the marine vessel maneuvering system 100 includes the display 15 to display the speed u of the hull 10. The controller 14 is configured or programmed to perform the notification control to notify the vessel operator by displaying on the display 15 that the water BW behind the hull 10 may enter the hull 10 due to deceleration of the hull 10 when it is determined that the water BW behind the hull 10 may enter the hull 10. Accordingly, the information displayed on the display 15 by the notification control that the water BW behind the hull 10 may enter the hull 10 due to deceleration of the hull 10 allows the vessel operator to easily visually recognize that the water BW behind the hull 10 may enter the hull 10 due to deceleration of the hull 10.

According to a preferred embodiment of the present invention, the controller 14 is configured or programmed to perform the water entry determination control when the hull 10 is decelerating from the speed u0 at which the hull 10 is in the planing state. When the hull 10 is decelerated to change from the planing state to a non-planing state, the depth d of the transom 12 below the water surface WS momentarily becomes particularly large, and thus the height H of the water BW behind the hull 10 that rises above the water surface WS momentarily increases. Thus, the water BW is likely to enter the hull 10 from behind. Accordingly, when the water BW is particularly likely to enter the hull 10 from behind, such as when the hull 10 is decelerating from the speed u0 at which the hull 10 is in the planing state, the water entry determination control is performed such that entry of the water BW behind the hull 10 into the hull 10 is effectively reduced or prevented when the hull 10 is decelerating.

According to a preferred embodiment of the present invention, the controller 14 is configured or programmed to perform the water entry determination control when the hull 10 is decelerating at the deceleration greater than the predetermined deceleration threshold a0. When the height H of the water BW behind the hull 10 that rises above the water surface WS due to deceleration of the hull 10 becomes greater than the height h of the transom 12 of the hull 10 above the water surface WS, the amount of water BW that may enter the hull 10 from behind increases as the deceleration of the hull 10 increases. Accordingly, when the amount of water BW that may enter the hull 10 from behind is likely to increase, such as when the hull 10 is decelerating at the deceleration greater than the predetermined deceleration threshold a0, the water entry determination control is performed such that entry of the water BW behind the hull 10 into the hull 10 is effectively reduced or prevented when the hull 10 is decelerating.

According to a preferred embodiment of the present invention, the controller 14 is configured or programmed to perform the water entry determination control when the hull 10 is moving forward while decelerating. When the hull 10 is moving forward, the vessel operator maneuvers the marine vessel 110 while paying attention mainly to the front of the hull 10, and thus it is difficult for the vessel operator to know the situation behind the hull 10. Accordingly, when it is difficult for the vessel operator to know the situation behind the hull 10, such as when the hull 10 is moving forward, the water entry determination control is performed such that entry of the water BW behind the hull 10 into the hull 10 is effectively reduced or prevented when the hull 10 is decelerating.

According to a preferred embodiment of the present invention, the controller 14 is configured or programmed to perform the water entry determination control when the hull 10 is decelerating, and the marine vessel 110 is in the water entry determination mode in which the water entry determination control is performed. Accordingly, when the water entry determination control is desired, the marine vessel 110 is operated to enter the water entry determination mode such that the water entry determination control is performed. When the water entry determination control is not desired, the marine vessel 110 is operated to not enter the water entry determination mode such that the water entry determination control is not performed.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the controller 14 preferably performs the water entry determination control when the hull 10 is decelerating, and the marine vessel 110 is in the water entry determination mode in which the water entry determination control is performed in preferred embodiments described above, the present invention is not restricted to this. In a preferred embodiment of the present invention, the controller may alternatively perform the water entry determination control when the hull is decelerating regardless of whether or not the marine vessel is in the water entry determination mode.

While the controller 14 preferably performs the water entry determination control when the hull 10 is moving forward while decelerating in preferred embodiments described above, the present invention is not restricted to this. In a preferred embodiment of the present invention, the controller may alternatively perform the water entry determination control when the hull is decelerating regardless of whether or not the hull is moving forward.

While the controller 14 preferably performs the water entry determination control when the hull 10 is decelerating at the deceleration greater than the predetermined deceleration threshold a0 in preferred embodiments described above, the present invention is not restricted to this. In a preferred embodiment of the present invention, the controller may alternatively perform the water entry determination control when the hull is decelerating regardless of whether or not the hull is decelerating at the deceleration greater than the predetermined deceleration threshold.

While the controller 14 preferably performs the water entry determination control when the hull 10 is decelerating from the speed u0 at which the hull 10 is in the planing state in preferred embodiments described above, the present invention is not restricted to this. In a preferred embodiment of the present invention, the controller may alternatively perform the water entry determination control when the hull is decelerating from a speed at which the hull is not in the planing state.

While the controller 14 preferably performs the notification control to notify the vessel operator by displaying on the display 15 that the water BW behind the hull 10 may enter the hull 10 due to deceleration of the hull 10 when it is determined that the water BW behind the hull 10 may enter the hull 10 in preferred embodiments described above, the present invention is not restricted to this. In a preferred embodiment of the present invention, the controller may alternatively perform the notification control to notify the vessel operator that the water behind the hull may enter the hull due to deceleration of the hull by generating light, generating a sound, or generating vibrations, for example when it is determined that the water behind the hull may enter the hull.

While the controller 14 preferably acquires the area S of the transom 12 below the water surface WS and the depth d of the transom 12 below the water surface WS based on the information I acquired in advance for the hull 10 and representing the correlation between both the heave amount HV and the pitch angle PA and the area S of the transom 12 below the water surface WS and the correlation between both the heave amount HV and the pitch angle PA and the depth d of the transom 12 below the water surface WS in preferred embodiments described above, the present invention is not restricted to this. In a preferred embodiment of the present invention, the controller may alternatively acquire the heave amount and the pitch angle based on the speed and shape of the hull. Accordingly, the heave amount and the pitch angle are easily acquired based on the speed and shape of the hull.

While the controller 14 preferably acquires the heave amount HV with the global satellite positioning system 120 in preferred embodiments described above, the present invention is not restricted to this. In a preferred embodiment of the present invention, the controller may alternatively acquire the heave amount with a water pressure sensor or a water depth sensor, may alternatively acquire the heave amount with any two of the global satellite positioning system, the water pressure sensor, and the water depth sensor, or may alternatively acquire the heave amount with the global satellite positioning system, the water pressure sensor, and the water depth sensor. When the heave amount is acquired with the water pressure sensor or the water depth sensor, the heave amount is accurately acquired.

While the controller 14 preferably acquires the pitch angle PA with the gyro sensor 16 in preferred embodiments described above, the present invention is not restricted to this. In a preferred embodiment of the present invention, the controller may alternatively acquire the pitch angle with an acceleration sensor or may alternatively acquire the pitch angle with the gyro sensor and the acceleration sensor. When the pitch angle is acquired with the acceleration sensor, the pitch angle is accurately acquired.

While the controller 14 preferably acquires the area S of the transom 12 below the water surface WS and the depth d of the transom 12 below the water surface WS based on the heave amount HV and the pitch angle PA in preferred embodiments described above, the present invention is not restricted to this. In a preferred embodiment of the present invention, the controller may alternatively acquire the area of the transom below the water surface and the depth of the transom below the water surface based on information other than the heave amount and the pitch angle.

While the controller 14 preferably acquires the volume V of the water BW behind the hull 10 that rises above the water surface WS due to deceleration of the hull 10 based on the area S of the transom 12 below the water surface WS and the speed u of the hull 10 in preferred embodiments described above, the present invention is not restricted to this. In a preferred embodiment of the present invention, the controller may alternatively acquire the volume of the water behind the hull that rises above the water surface due to deceleration of the hull based on information such as the volume of a submerged portion of the hull other than the area of the transom below the water surface and the speed of the hull.

While the controller 14 preferably acquires the height H of the water BW behind the hull 10 that rises above the water surface WS due to deceleration of the hull 10 based on the volume V of the water BW behind the hull 10 that rises above the water surface WS due to deceleration of the hull 10 in preferred embodiments described above, the present invention is not restricted to this. In a preferred embodiment of the present invention, the controller may alternatively acquire the height of the water behind the hull that rises above the water surface due to deceleration of the hull based on information other than the volume of the water behind the hull that rises above the water surface due to deceleration of the hull.

While the controller 14 preferably acquires the height H of the water BW behind the hull 10 that rises above the water surface WS due to deceleration of the hull 10 based on the volume V of the water BW behind the hull 10 that rises above the water surface WS due to deceleration of the hull 10 in preferred embodiments described above, the present invention is not restricted to this. In a preferred embodiment of the present invention, the controller may alternatively perform the water entry determination control based on the height of waves around the hull in addition to the height of the water behind the hull that rises above the water surface due to deceleration of the hull and the height of the transom above the water surface. When the waves around the hull move violently, the height of the waves around the hull influences the possibility of entry of the water behind the hull into the hull due to deceleration of the hull. Accordingly, even when the waves around the hull move violently, it is easily determined whether or not the water behind the hull that rises above the water surface due to deceleration of the hull may enter the hull based on the height of the waves around the hull in addition to the height of the water behind the hull that rises above the water surface due to deceleration of the hull and the height of the transom of the hull above the water surface.

While the controller 14 preferably performs the water entry determination control based on the height H of the water BW behind the hull 10 that rises above the water surface WS due to deceleration of the hull 10 and the height h of the transom 12 of the hull 10 above the water surface WS in preferred embodiments described above, the present invention is not restricted to this. In a preferred embodiment of the present invention, the controller may alternatively perform the water entry determination control based on a condition other than the height of the water behind the hull that rises above the water surface due to deceleration of the hull and the height of the transom of the hull above the water surface.

Figure 8:
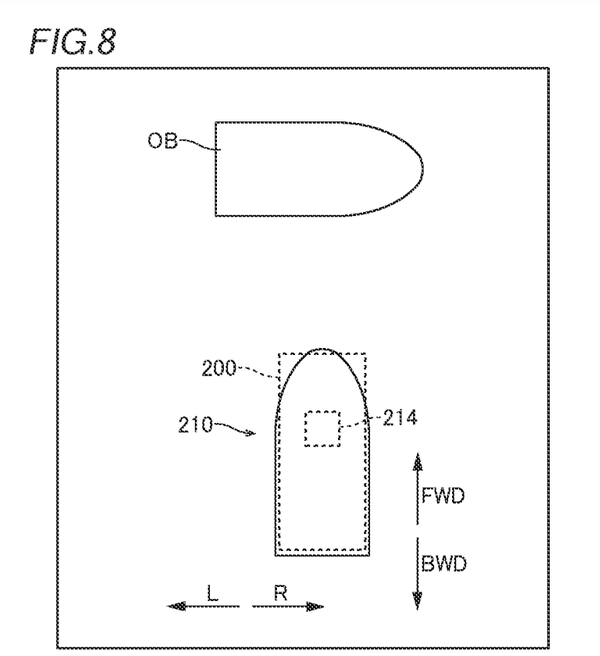
FIG. 8 is a diagram illustrating an obstacle determination control of a marine vessel maneuvering system according to a modified example of a preferred embodiment of the present invention.

While the controller 14 preferably performs the notification control to notify the vessel operator that the water BW behind the hull 10 may enter the hull 10 due to deceleration of the hull 10 when it is determined that the water BW behind the hull 10 may enter the hull 10 in preferred embodiments described above, the present invention is not restricted to this. In a preferred embodiment of the present invention, as in a marine vessel maneuvering system 200 (marine vessel 210) according to a modified example shown in FIG. 8, a controller 214 may not perform a notification control to notify a vessel operator that water BW behind a hull 10 may enter the hull 10 due to deceleration of the hull 10 when it is determined that the water BW behind the hull 10 may enter the hull 10. In such a case, as shown in FIG. 8, the controller 214 may perform an obstacle determination control to determine whether or not an obstacle OB exists in front of the hull 10. The obstacle determination control is performed based on information detected by a camera or radar, for example. Furthermore, when it is determined that the water BW behind the hull 10 may enter the hull 10 and it is determined that an obstacle OB does not exist in front of the hull 10, the controller 214 may perform an acceleration change control to reduce the deceleration of the hull 10, maintain the speed of the hull 10 constant, or increase the speed of the hull 10 in order to prevent the water BW behind the hull 10 from entering the hull 10. Accordingly, when it is determined that the water BW behind the hull 10 may enter the hull 10 and it is determined that an obstacle OB does not exist in front of the hull 10, the acceleration change control is performed to prevent the water BW behind the hull 10 from entering the hull 10, and thus the vessel operator does not need to take measures to prevent the water BW behind the hull 10 from entering the hull 10 due to deceleration of the hull 10. FIG. 8 shows an example in which the obstacle OB is a marine vessel.

While the outboard motor 20 is preferably an engine outboard motor including the engine 22 to drive the propeller 21 in preferred embodiments described above, the present invention is not restricted to this. In a preferred embodiment of the present invention, the outboard motor may alternatively be an electric outboard motor including an electric motor to drive a propeller.

While only one outboard motor 20 is preferably attached to the stern 11 of the hull 10 in preferred embodiments described above, the present invention is not restricted to this. In a preferred embodiment of the present invention, two or more outboard motors may alternatively be attached to the stern of the hull.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel maneuvering system comprising:
   a hull; and
   a controller configured or programmed to control a speed of the hull; wherein
   the controller is configured or programmed to:
      perform a water entry determination control to determine whether or not water behind the hull that rises above a water surface due to deceleration of the hull may enter the hull when the hull is decelerating; and
      perform a notification control to notify a vessel operator that the water behind the hull may enter the hull due to the deceleration of the hull when it is determined that the water behind the hull may enter the hull.

2. The marine vessel maneuvering system according to claim 1, wherein the controller is configured or programmed to perform the water entry determination control based on a height of the water behind the hull that rises above the water surface due to the deceleration of the hull and a height of a transom of the hull above the water surface.

3. The marine vessel maneuvering system according to claim 2, wherein the controller is configured or programmed to acquire the height of the water behind the hull that rises above the water surface due to the deceleration of the hull based on a volume of the water behind the hull that rises above the water surface due to the deceleration of the hull.

4. The marine vessel maneuvering system according to claim 3, wherein the controller is configured or programmed to:
   acquire the volume of the water behind the hull that rises above the water surface due to the deceleration of the hull based on an area of the transom below the water surface and the speed of the hull; and
   acquire the height of the transom above the water surface based on a height of the transom and a depth of the transom below the water surface.

5. The marine vessel maneuvering system according to claim 4, wherein the controller is configured or programmed to acquire the area of the transom below the water surface and the depth of the transom below the water surface based on a heave amount representing an amount of upward-downward deviation of the hull from a reference position and a pitch angle representing a forward-rearward tilt of the hull.

6. The marine vessel maneuvering system according to claim 5, wherein the controller is configured or programmed to acquire the area of the transom below the water surface and the depth of the transom below the water surface based on information acquired in advance for the hull and representing a correlation between both the heave amount and the pitch angle and the area of the transom below the water surface and a correlation between both the heave amount and the pitch angle and the depth of the transom below the water surface.

7. The marine vessel maneuvering system according to claim 5, wherein the controller is configured or programmed to:
   acquire the heave amount with at least one of a global satellite positioning system, a water pressure sensor, or a water depth sensor; and
   acquire the pitch angle with at least one of a gyro sensor or an acceleration sensor.

8. The marine vessel maneuvering system according to claim 5, wherein the controller is configured or programmed to acquire the heave amount and the pitch angle based on the speed of the hull and a shape of the hull.

9. The marine vessel maneuvering system according to claim 1, further comprising:
   a display to display the speed of the hull; wherein
   the controller is configured or programmed to perform the notification control to notify the vessel operator by displaying on the display that the water behind the hull may enter the hull due to the deceleration of the hull when it is determined that the water behind the hull may enter the hull.

10. The marine vessel maneuvering system according to claim 1, wherein the controller is configured or programmed to perform the water entry determination control when the hull is decelerating from a speed at which the hull is in a planing state.

11. The marine vessel maneuvering system according to claim 1, wherein the controller is configured or programmed to perform the water entry determination control when the hull is decelerating at a deceleration greater than a predetermined deceleration threshold.

12. The marine vessel maneuvering system according to claim 1, wherein the controller is configured or programmed to perform the water entry determination control when the hull is moving forward while decelerating.

13. The marine vessel maneuvering system according to claim 1, wherein the controller is configured or programmed to perform the water entry determination control when the hull is decelerating, and the marine vessel is in a water entry determination mode in which the water entry determination control is performed.

14. The marine vessel maneuvering system according to claim 2, wherein the controller is configured or programmed to perform the water entry determination control based on a height of waves around the hull in addition to the height of the water behind the hull that rises above the water surface due to the deceleration of the hull and the height of the transom above the water surface.

15. A marine vessel maneuvering system comprising:
   a hull; and
   a controller configured or programmed to control a speed of the hull; wherein
   the controller is configured or programmed to perform a water entry determination control to determine whether or not water behind the hull that rises above a water surface due to deceleration of the hull may enter the hull when the hull is decelerating.

16. The marine vessel maneuvering system according to claim 15, wherein the controller is configured or programmed to:
   perform an obstacle determination control to determine whether or not an obstacle exists in front of the hull; and
   perform an acceleration change control to reduce a deceleration of the hull, maintain the speed of the hull constant, or increase the speed of the hull in order to prevent the water behind the hull from entering the hull when it is determined that the water behind the hull may enter the hull and when it is determined that an obstacle does not exist in front of the hull.

17. A marine vessel comprising:
   a hull; and
   a controller configured or programmed to control a speed of the hull; wherein
   the controller is configured or programmed to:
      perform a water entry determination control to determine whether or not water behind the hull that rises above a water surface due to deceleration of the hull may enter the hull when the hull is decelerating; and
      perform a notification control to notify a vessel operator that the water behind the hull may enter the hull due to the deceleration of the hull when it is determined that the water behind the hull may enter the hull.

18. The marine vessel according to claim 17, wherein the controller is configured or programmed to perform the water entry determination control based on a height of the water behind the hull that rises above the water surface due to the deceleration of the hull and a height of a transom of the hull above the water surface.

19. The marine vessel according to claim 18, wherein the controller is configured or programmed to acquire the height of the water behind the hull that rises above the water surface due to the deceleration of the hull based on a volume of the water behind the hull that rises above the water surface due to the deceleration of the hull.

20. The marine vessel according to claim 19, wherein the controller is configured or programmed to:
   acquire the volume of the water behind the hull that rises above the water surface due to the deceleration of the hull based on an area of the transom below the water surface and the speed of the hull; and acquire the height of the transom above the water surface based on a height of the transom and a depth of the transom below the water surface.

\* \* \* \* \*